United States Patent
Dameron

(10) Patent No.: US 6,662,457 B2
(45) Date of Patent: Dec. 16, 2003

(54) METHOD AND APPARATUS FOR ALIGNING AND CUTTING PIPE

(75) Inventor: Dennis Dameron, Gloucester, VA (US)

(73) Assignee: Laser Alignment Systems, Gloucester, VA (US)

(*) Notice: Subject to any disclaimer, the term of this patent is extended or adjusted under 35 U.S.C. 154(b) by 91 days.

(21) Appl. No.: 09/896,855

(22) Filed: Jun. 29, 2001

(65) Prior Publication Data

US 2002/0138995 A1 Oct. 3, 2002

Related U.S. Application Data

(60) Provisional application No. 60/280,271, filed on Mar. 30, 2001.

(51) Int. Cl.[7] .............................................. G01B 11/26
(52) U.S. Cl. ............................ 33/286; 33/412; 33/529; 33/628; 83/520; 83/54; 83/745
(58) Field of Search ...................... 33/DIG. 21, 290, 33/293, 286, 529, 613, 645, 412, 628; 83/520, 54, 745

(56) References Cited

U.S. PATENT DOCUMENTS

| | | | | |
|---|---|---|---|---|
| 3,612,700 A | * | 10/1971 | Nelson ........................ | 33/286 |
| 3,801,205 A | * | 4/1974 | Eggenschwyler ...... | 33/DIG. 21 |
| 4,580,345 A | * | 4/1986 | Andrew ....................... | 33/529 |
| 4,712,953 A | | 12/1987 | Witzel et al. | |
| 5,359,781 A | * | 11/1994 | Melville ....................... | 33/286 |
| 5,394,616 A | | 3/1995 | Claxton | |
| 5,617,645 A | * | 4/1997 | Wick et al. ............. | 33/DIG. 21 |
| 5,860,220 A | * | 1/1999 | Gerd ............................ | 33/529 |
| 6,052,911 A | | 4/2000 | Davis | |
| 6,124,935 A | * | 9/2000 | Matthews .................... | 33/286 |
| 6,266,143 B1 | * | 7/2001 | Peterson et al. .............. | 33/293 |
| 6,357,129 B1 | * | 3/2002 | Gray et al. ................... | 33/293 |

FOREIGN PATENT DOCUMENTS

JP 404313001 A * 11/1992 .................. 33/529

* cited by examiner

Primary Examiner—Christopher W. Fulton
Assistant Examiner—Travis Reis
(74) Attorney, Agent, or Firm—Lawrence E. Laubscher, Jr.

(57) ABSTRACT

A method and apparatus for aligning and cutting pipes to extract and install piping in industrial plants is characterized by the use of lasers on a ring for aligning the cutting tool. By adjusting the ring so that beams from the lasers strike specified targets at a remote location corresponding with a pipe end, a cutting location is defined so that the trimmed end of a first pipe will properly align with a remote pipe. When the pipes welded together, their ends will match, thereby minimizing stress in the pipe. A cutting tool can be provided directly on the ring so that the pipe can be cut without removing the ring.

22 Claims, 7 Drawing Sheets

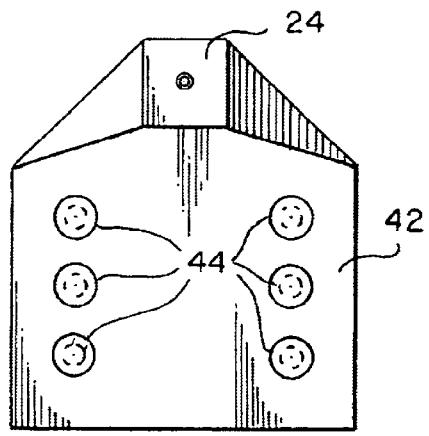
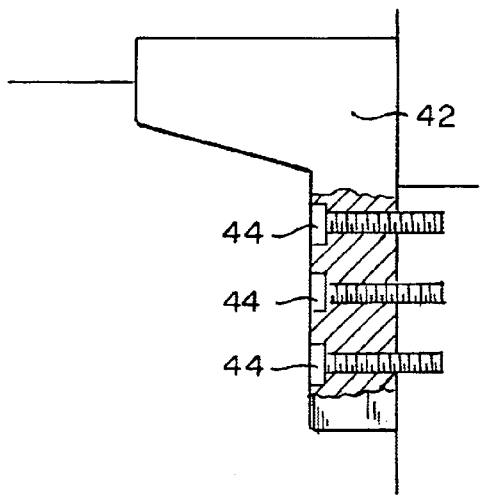
FIG. 11          FIG. 12
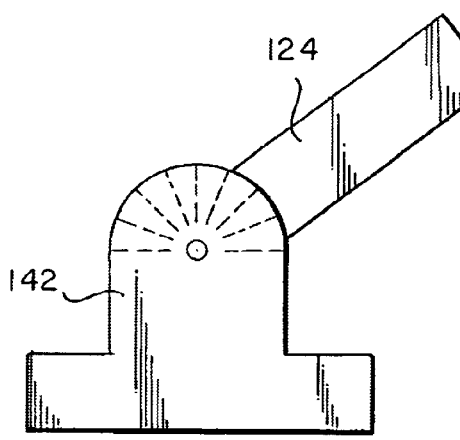
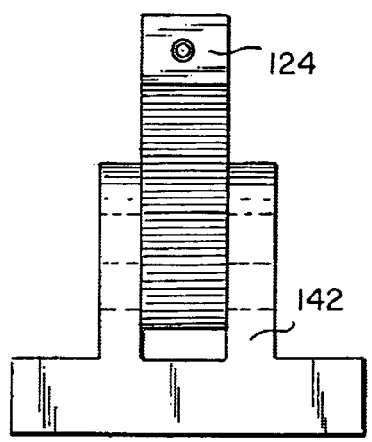
FIG. 13          FIG. 14

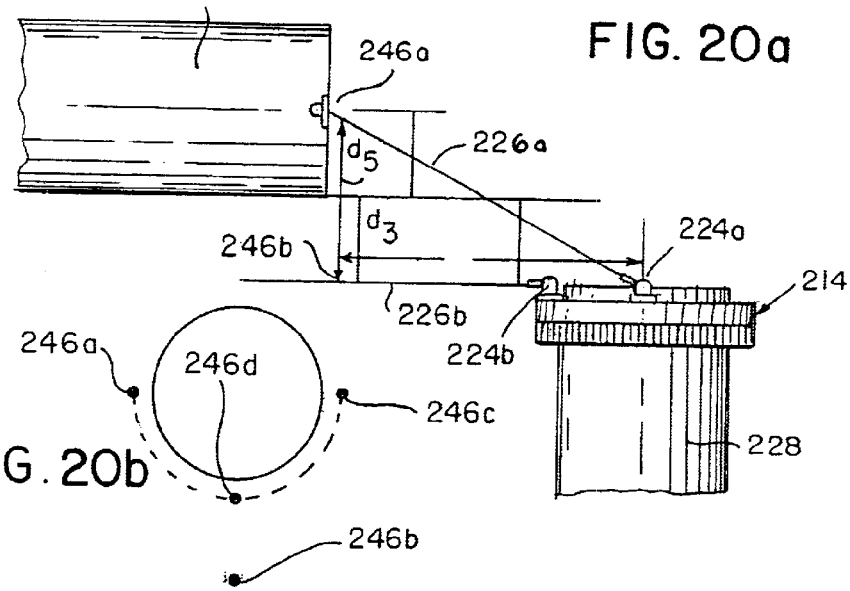
FIG. 20a
FIG. 20b
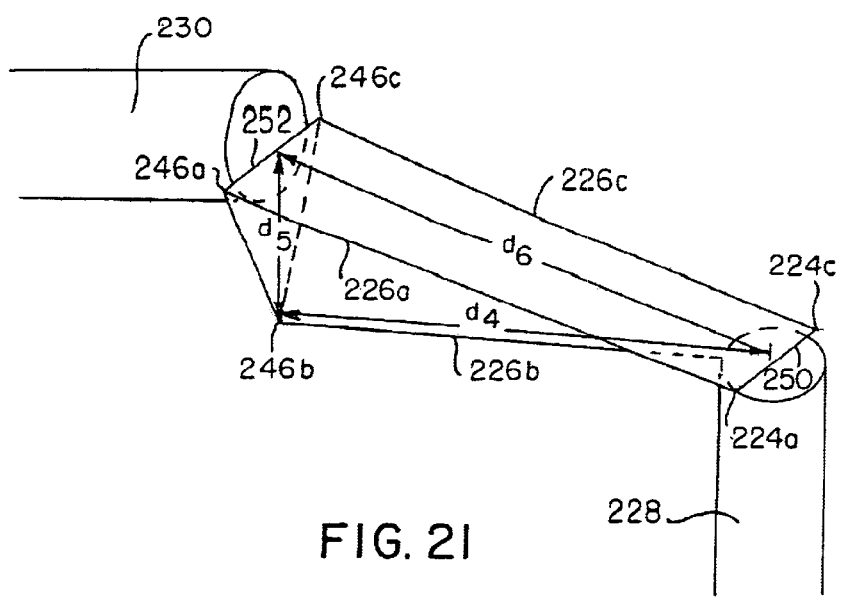
FIG. 21

METHOD AND APPARATUS FOR ALIGNING AND CUTTING PIPE

This application claims the benefit of U.S. Provisional Application No. 60/280,271 filed on Mar. 30, 2001.

BACKGROUND OF THE INVENTION

With the aging of industrial plants, many plants need to be rebuilt. A primary reason for failure of an industrial plant is a breakdown of its piping system owing to stress applied to the system. Stress results from heating and cooling of fluids in the pipes which causes them to expand and contract. Stress also results from improper fitting of pipes during initial construction. Sections of pipe are connected at their ends, generally by welding. For a proper fit, the end surface of a new or replacement pipe is cut and beveled to match the end surface of an existing pipe. For large pipes, i.e. those having a diameter on the order of 20 inches or more, a cutting tool is used either to cut a section of pipe to length or to trim the end surface thereof to match the end surface of the pipe with which it is to be connected. The cutting tool, which may weigh as much as 200 pounds, is positioned on the pipe, to cut the edge to a desired configuration. Unfortunately, much guesswork is involved in positioning the tool which is also cumbersome to adjust. Using trial and error, a pipe fitter cuts the pipe to as close an approximation of the proper end surface configuration as possible. Then the pipe sections are connected together.

The present invention relates to a method and apparatus for cutting and fitting pipes so that they are properly aligned for welding to create a stress-free piping system. The invention may also be used in the replacement of worn or damaged pipe sections under stress.

BRIEF DESCRIPTION OF THE PRIOR ART

Laser devices for centering pipes are well-known in the patented prior art as evidenced by the to Davis U.S. Pat. No. 6,052,911. As disclosed therein, a laser is rotatably connected with a frame which is mounted on the pipe. The axis of the laser is aligned with the centerline of the pipe and is used to provide marks which assist in aligning a new pipe parallel to an old pipe.

While the prior devices operate satisfactorily, they are rather cumbersome and do not afford the opportunity for a pipefitter to both align and cut a section of pipe with a single instrument, which greatly reduces the time and increases the accuracy of the cutting process. The present invention was developed in order to overcome these and other drawbacks of the prior devices by providing an improved method and apparatus for efficiently aligning and cutting pipes, particularly metal pipes in the piping system of an industrial plant. It will greatly enhance the ability of a person of average pipe cutting and fitting skills to install or replace pipes in the piping system.

SUMMARY OF THE INVENTION

Accordingly, it is a primary object of the present invention to provide a method and apparatus for aligning and cutting a cylindrical pipe having a longitudinal axis in which a frame or ring is mounted on the periphery of the pipe and has a laser mounted thereon. The laser generates a linear laser beam and the frame is adjusted so that the beam is directed onto a fixed remote target corresponding with the end of another pipe. Once adjusted, the frame is secured in place and a cutting tool is used to cut the pipe in a configuration to match and mate with the end of the other pipe.

According to a further object of the invention, a plurality of lasers are provided on the frame in spaced relation. The lasers are preferably adjustably connected with the frame so that the beams therefrom can be directed at selected angles relative to the longitudinal axis of the pipe.

It is yet another object of the invention to align and cut a damaged section of pipe for removal and to align and cut both ends of a replacement section of pipe for a precise fit of the replacement section with minimal stress after welding the replacement section.

A further object of the invention is to provide a method and apparatus for aligning and cutting a cylindrical pipe adjacent to an elbow portion thereof by mounting a ring on the pipe about the pipe circumference before the elbow portion and establishing a pair of first reference points spaced 90° relative to a longitudinal axis of another pipe at a remote location beyond the elbow and establishing a pair of second reference points on the ring and spaced 90° relative to a longitudinal axis of the pipe. The ring is adjusted to a fixed position so that the pair of second reference points are oriented in a configuration corresponding to the pair of first reference points to define a cutting location so that after cutting, the cut end surface of the pipe will be in 90° alignment with the end of the first pipe.

According to another object of the invention, the ring is adjusted on the pipe via triangulation.

BRIEF DESCRIPTION OF THE FIGURES

Other objects and advantages of the invention will become apparent from a study of the following specification, when viewed in the light of the accompanying drawing, in which:

FIGS. 11 and 12 are front and side views, respectively, of a mounting bracket for a laser according to the invention;

FIGS. 13 and 14 are front and side plan views, respectively, of an adjustable mounting bracket for a laser according to the invention;

FIGS. 20a and 20b are side plan and front views, respectively, showing a first technique for cutting pipe at an elbow;

FIG. 21 is a perspective view illustrating the alignment of the end faces of two pipes on opposite ends of an elbow portion;

DETAILED DESCRIPTION

The pipe alignment and cutting technique according to a first embodiment of the invention will be described with reference to FIGS. 1 and 2. As shown therein, a generally cylindrical ring 2 includes a clamping device 4 for clamping the ring around a cylindrical pipe (not shown) having a longitudinal axis. Any suitable clamping device may be used such as a nut and bolt, a spring latch, or the like. A laser 6 is mounted on the ring and generates a linear laser beam 8 which extends parallel to the axis of the pipe.

In accordance with the inventive method, the ring is loosely positioned on the pipe whose end face is to be cut. The ring is adjusted so that the laser beam is dissected onto a remote target corresponding with the end of another pipe to be connected with the first pipe. The ring is then clamped into a fixed position, the pipe is marked in accordance with the fixed position, and the pipe is cut. Thus, the cut end surface has a configuration which will align with the end surface of the remote pipe so that the pipes can be joined together in mating fashion such as by welding without inducing any stress in the joined pipes.

A more accurate position of the cutting ring on the pipe for better alignment with the remote pipe end is achieved by rotating the ring 90° about the longitudinal pipe so that the laser beam strikes a second target. The first and second targets provide two reference points spaced by 90° to effectively "square-up" the ring on the pipe to be cut. That is, the ring is aligned in two planes, one for each target, to properly orient the ring to the required position for marking the cutting location on the pipe.

In addition to aiding with focusing on two targets, the laser of the invention can also be used to measure the distance from the ring to the target along the beam. The distance measurements are helpful in setting the position of the ring so that the distances along the beams to both targets are the same.

Figures 1, 2:
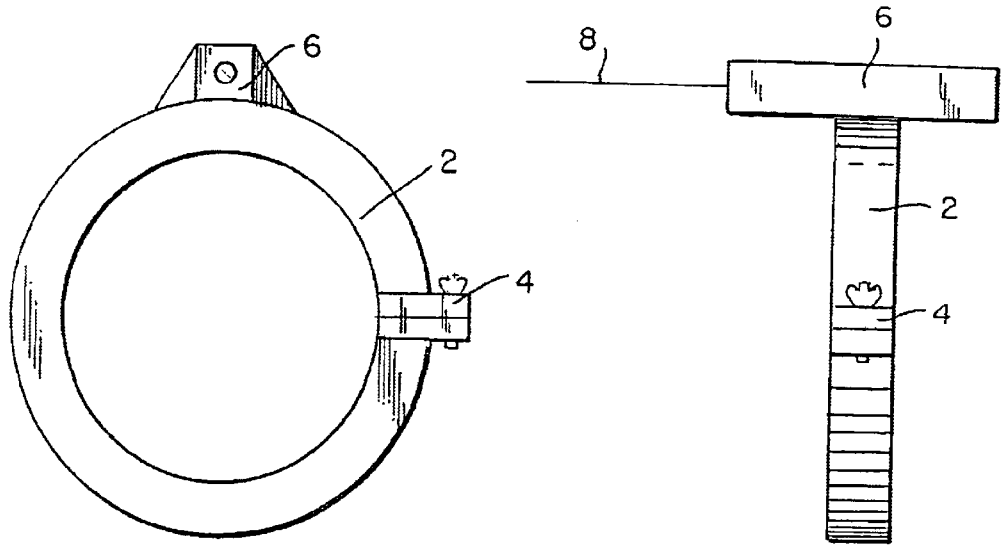
FIGS. 1 and 2 are front and side plan views, respectively of an alignment ring having a laser thereon in accordance with the pipe cutting method and apparatus of the invention.
Figure 3:
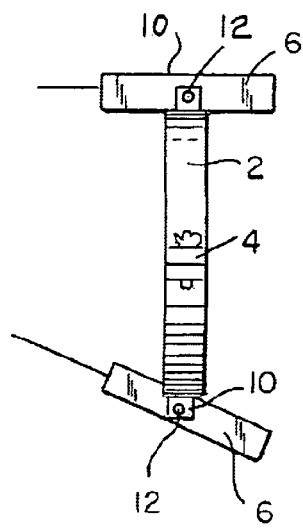
FIG. 3 is a side plan view of an alternate embodiment of the alignment ring of the invention having a plurality of adjustable lasers thereon.

In FIG. 3 is shown an alternate embodiment of the ring of FIG. 1. A plurality of lasers 6 are connected with the ring 2. The lasers are preferably equally spaced about the ring. Moreover, the lasers are adjustably connected with the ring so that the beams thereof are directed at an angle relative to the axis of the pipe having the ring arranged thereon. In the embodiment shown, the lasers are pivotally connected with brackets 10 on the ring via pivot pins 12.

Figure 5:
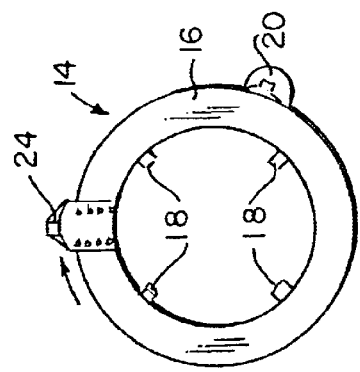
FIGS. 4 and 5 are front plan views showing a pipe mounting frame having a cutting tool and a laser mounted thereon, respectively.
Figure 4:
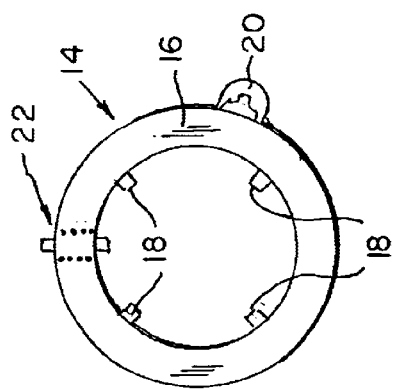
Figure 7:
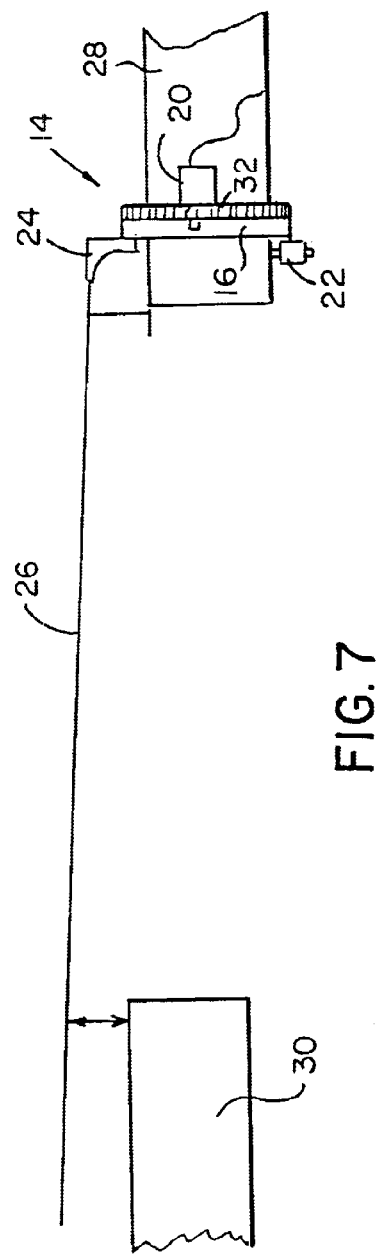
FIG. 7 is a side plan view of a cutting tool of the invention and illustrating an alignment beam used therewith.

Referring now to FIGS. 4 and 5, there is shown a pipe cutting device 14 according to the invention. The device includes a ring 16 having a plurality of adjustable legs 18 for mounting the ring about the outer circumferential surface of a first cylindrical pipe having a longitudinal axis. The ring is adapted to rotate with respect to the pipe when driven by a motor 20. A cutting tool 22 is connected with the ring by any suitable fasteners such as bolts. The cutting tool can be replaced by a laser 24 as shown in FIG. 5. The laser 24 generates a linear laser beam 26 as shown in FIG. 7 and can be used to align the ring on the pipe as described above. Once aligned, the laser can be replaced with the cutting tool 22 to cut the pipe.

Figure 6:
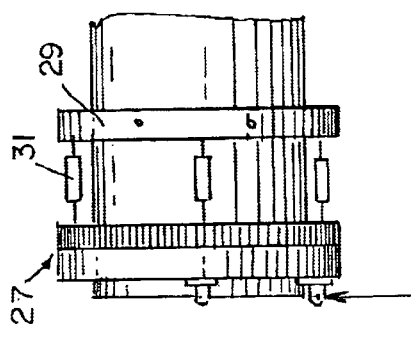
FIG. 6 is a side view of an alternate assembly for mounting an alignment tool on a pipe.

In lieu of the clamping bolt (FIGS. 1–3) or adjustable legs (FIGS. 4 and 5), an alignment tool 27 can be adjustably mounted on a pipe using a separate ring 29 including a plurality of turnbuckles 31 connected with the tool as shown in FIG. 6. The ring 29 is secured to the pipe in coaxial relation therewith. By loosening or tightening selected turnbuckles, which extend around the pipe, the alignment tool is adjusted to align the tool on the pipe as set forth above.

In FIG. 7 is shown an embodiment for cutting the end of pipe 28 to match the end of pipe 30. In this embodiment, the ring is mounted on an inner frame 32 which is mounted on the pipe. The ring 16 thus rotates with respect to the stationary frame. In addition, the cutting tool 14 is mounted on the ring to provide a combined alignment and cutting device for the pipe.

In order to connect the pipe 28 with a second cylindrical pipe 30 having a longitudinal axis, it is desirable to match the ends of the pipes so that when the pipes are welded together, there is a minimal amount of stress because the pipes are properly aligned. The invention is used to align, cut and bevel the end of a pipe so that it can be matched or mated with another pipe of the same diameter. Accordingly, with the frame 32 mounted on the pipe to be cut adjacent to an end thereof, the laser beam is directed toward the second pipe. By adjusting the orientation of the frame on the pipe 28, the laser beam can be redirected so as to strike a target associated with the second pipe 30. For example, the target can be at a distance $d_1$ from the second pipe corresponding with a distance $d_1$ from which the laser beam is offset from the outer surface of the first pipe. Once the frame is properly adjusted, the inner frame is fixed to the first pipe, such as for example, by adjusting the legs thereof. With the frame fixed on the pipe, the ring and cutting tool 22 are driven around the pipe by the motor 20 to cut an end portion off of the pipe to define a properly configured new end surface for the pipe 28. Depending on the type of cutting tool used, the end surface of the pipe can be flush and/or beveled for mating with the second pipe.

For a more precise cut, after alignment with a first target, the ring is rotated 90° and aligned with a second target (not shown) also spaced at a distance $d_1$ from a corresponding portion of the remote pipe 30. Alignment relative to two targets offset by 90° provides a very accurate cutting position for the tool.

Figure 8:
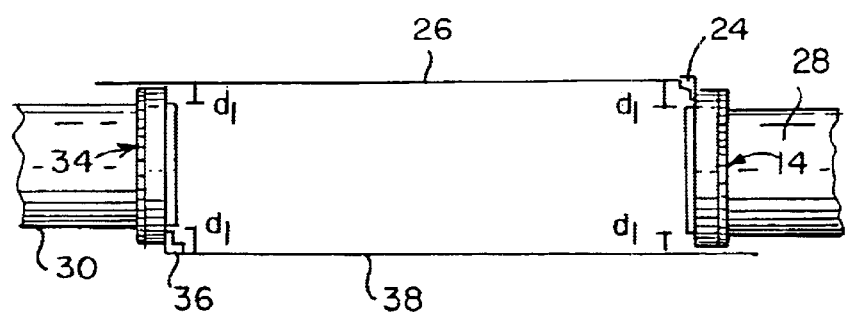
FIGS. 8 and 9 are side plan views showing the use of two cutting tools for trimming and removing sections of pipe, respectively.

Referring now to FIG. 8, there is shown the first and second pipes 28, 30, each having alignment and cutting tools 14, 34 thereon. With this arrangement, the ends of the respective pipes can be aligned and cut in the same manner as with the single tool of FIG. 7 so that the pipes can be connected without introducing any stress thereto. Preferably, the laser 36 on the tool 34 mounted on the second pipe 30 is arranged 180° relative to the laser 24 on the first cutting tool 14 to provide a beam 38 spaced from the pipe surfaces by the same distance $d_1$ as the spacing of the first laser beam 26 from the pipe surfaces. The tools are each rotated 90° for alignment with second targets prior to cutting the pipe ends.

Figure 9:
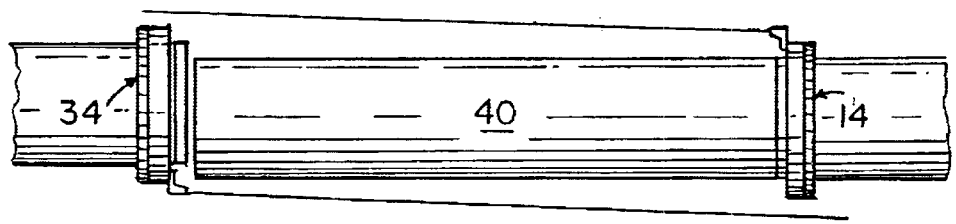

FIG. 9 is similar to FIG. 8 and illustrates the technique for removing a section 40 of pipe. The tool 34 cuts one end of the section 40 of pipe, which deflects downwardly from the original alignment of the pipe before cutting. The deflection is due to the stress in the original pipe (or from earlier pipe installation techniques) which occurs over time in the piping system of industrial plants. Next, the tool 14 is adjusted and then operated to cut the other end of the section 40 of pipe to be removed. A replacement section of pipe can have its ends cut with an orientation to match the ends of the original pipe using the same alignment and cutting tool and techniques described above so that the replacement section when welded to the original pipe will have minimal stress because of its alignment with the original pipe ends.

Figure 10:
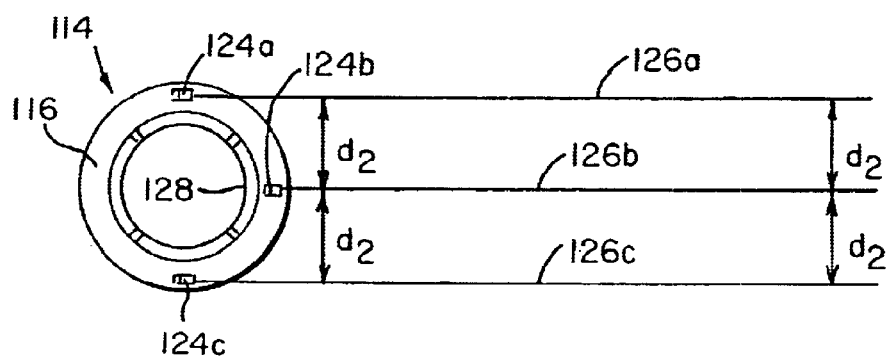
FIG. 10 is a front plan view showing a cutting tool frame having three laser devices mounted thereon.

FIG. 10 shows an alignment and cutting tool 114 according to an alternate embodiment of the invention wherein three lasers 124a–c are mounted on the ring 116 which in turn is mounted on a pipe 128. The lasers 124a and 124c are arranged 180° relative to each other around the frame, with the laser 124b being arranged at 90° therebetween. Thus, the beam 126b from the laser 124b is spaced the same distance $d_2$ between the beams 126a and 126c from the lasers 124a and 124c.

Fixed lasers have a fixed orientation relative to the frame. Such lasers 24 (FIG. 5) are connected with the frame via a fixed mounting bracket 42 as shown in FIGS. 11 and 12. The bracket is connected with the frame by any suitable fasteners such as bolts 44.

Alternatively, the lasers 124 (FIG. 10) can be mounted on adjustable brackets 142 such as shown in FIGS. 13 and 14. With adjustable brackets, the angle of the laser beam with respect to the longitudinal axis of the pipe can be adjusted as will be developed below.

Figure 15:
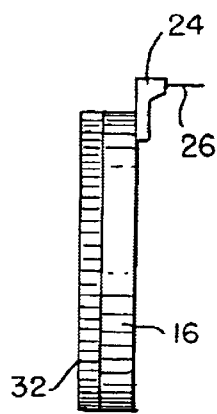
FIGS. 15–17 are side plan views, respectively, showing alternate mounting arrangement for a laser on a cutting tool according to the invention.
Figure 16:
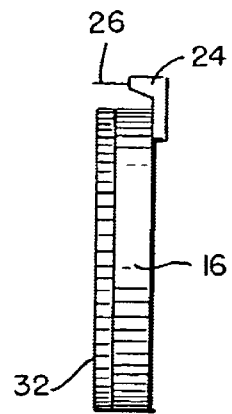
Figure 17:
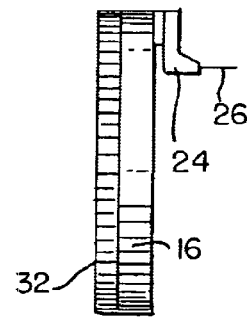

It is preferred that the lasers be arranged beyond the outer perimeter or circumference of the frame as shown in FIGS. 15 and 16 which show forwardly and rearwardly directed laser beams, respectively. In some instances however, it is desirable to arrange the laser within the outer perimeter of the frame as shown in FIG. 17.

Figure 18:
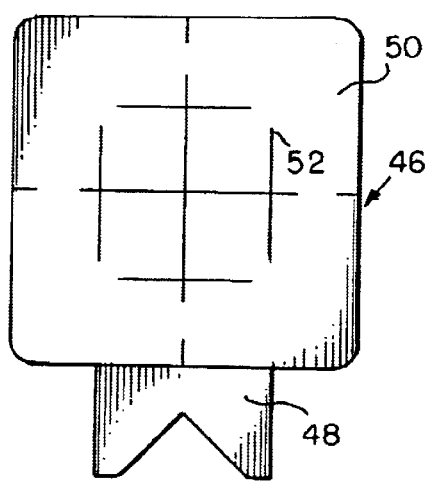
FIGS. 18 and 19 are front and side views, respectively, of a laser target used with the invention.
Figure 19:
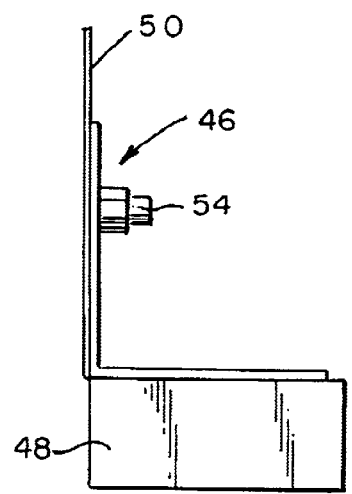

To facilitate alignment of the cutting tool, targets associated with the remote pipe whose end is being matched are provided. A preferred target is shown in FIGS. 18 and 19. The target 46 includes a base 48 which is preferably formed of a magnetic material for mounting on a pipe since most pipes in industrial plants are metal. Other materials for non-metal pipes may also be used. For example, an adhesive may be used to attach a target to a pipe. A plate 50 having indicia 52 printed on a surface thereof is adjustably connected with the base via a bolt 54 which passes through a slot (not shown) in an upper portion of the base. When the target 46 is mounted on a remote pipe, the plate 50 is adjusted so that the center thereof is a predetermined distance from the surface of the pipe. In FIGS. 7 and 8, for example, the target would be adjusted to the distance $d_1$. Next, the ring 16 is adjusted so that the laser beam 26 is directed to the center of the target. This sets the orientation of the cutting tool for a properly aligned cut of the pipe 28.

The embodiments and techniques described above are suitable for cutting linear pipe having a longitudinal axis. The tool and method of the invention can also be used on pipes having 90° elbows therein which are subject to failure from stress.

Referring now to FIGS. 20–24, use of the alignment and cutting tool 214 of the invention for cutting a pipe prior to an elongated 900 elbow (shown in FIG. 24) will be described. In the embodiment of FIGS. 20a and 20b, the tool has three lasers 224a, 224b, and 224c arranged thereon as in the embodiment of FIG. 10, with the lasers including adjustable brackets so that the beams can be directed at an angle relative to the longitudinal axis of the portion of the pipe 228 being cut. A target 246b is mounted on a remote pipe 230 beyond the elbow and spaced therefrom by a distance d3 which corresponds to the height of the inner curve of the elbow. The laser 224b is adjusted to direct its beam perpendicular to the axis of the pipe and the tool 214 is adjusted so that the beam 226b strikes the target 246b. Next, the laser 224b is adjusted upwardly until its beam strikes the bottom of the remote pipe 230 at point 246d.

From that point, equal distances are measured upwardly about the circumference of the pipe 230 to lateral positions 246a and 246c as shown in FIG. 20b at which points or locations additional targets are set. The angles for the lasers 224a and 224c are set to the same adjusted angle of laser 224b, and the tool 214 is then positioned to align the beams from the lasers 224a and 224c onto the target positions 246a and 246c. In FIG. 20a, the laser 224c and target 246c are not visible since they are on the backside of the tool 214 and pipe 230, respectively.

Referring to FIG. 21, there is shown a triangular wedge defined by the laser beams 226b (prior to adjustment), 226a, and 226c. The points 246a, 246b, and 246c from FIG. 20b define a triangle parallel to the face of the remote pipe 230.

Because the lasers 224a, b, and c can be used to measure distance, final positioning of the tool 214 on the first pipe 228 can be determined using triangulation. That is, the distance $d_4$ from the point 246b to the center of the pipe 228 is measured as the sum of the length of the beam 226b and the outer radius of the pipe 228. The distance $d_5$ from the point 246b to the center of the pipe 230 is measured as the sum of $d_3$ and the outer radius of the pipe 230. The distance $d_6$ between the centers of the pipes can be calculated via triangulation in accordance with the formula $$d_6^2 = d_4^2 + d_5^2$$

The diameter line 250 on the pipe 228 passes between the lasers 224a and 224c through the center of the pipe, and the diameter line 252 on the pipe 230 passes between the targets 246a and 246c through the center of the pipe. Thus, the distance $d_6$ between the centers of the pipe is also the distance between the laser 224a and target 246a and between the laser 224c and target 246c. The tool 214 can thus be positioned so that the lasers 224a and 224c are the required distance from their targets. This positioning provides the final position for the alignment tool. The pipe 228 can then be marked in accordance with the final position and subsequently cut by a separate cutting tool. Alternatively, where a combined alignment and cutting tool is provided, the cutting tool can be driven about the pipe 228 to cut the pipe end as aligned.

It should be readily apparent that prior to cutting, the end faces of the pipes shown in FIGS. 20a and 21 need not be square. However, once the alignment tool is positioned and aligned on the tool 228, the triangular wedge shown in FIG. 21 must be square. By square is meant that a rectangle is defined by the laser 224a, the target location 246a, the target location 246c and the laser 224c. For a non-elongated elbow, a true square would be defined. The "squaring" is possible because of the 90°×90° orientation between lasers 224a and 224b and between lasers 224b and 224c. This orientation is thus transposed to the target locations relative to the remote pipe.

Figures 22A, 22B:
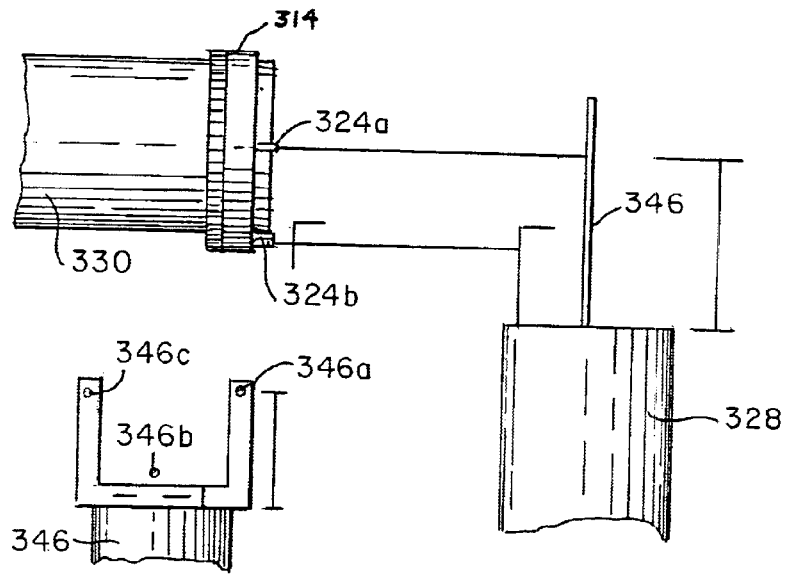
FIGS. 22a and 22b are side plan and front views, respectively, showing a second technique for cutting pipe at an elbow.

FIGS. 22a and 22b show an alternate embodiment for cutting pipe adjacent to an elbow. There, a square target 346 is arranged relative to a pipe 330. A cutting tool 314 having lasers 324a and 324b is mounted on a pipe 330. A third laser (not shown) is mounted on the tool opposite the laser 324a and 900 from the laser 324b. The laser 324b defines a location 346b in accordance with the height of the elbow and the lasers 324a and 324c (not visible) are directed toward target locations 346a and c in the same manner as described above in connection with FIGS. 20a and 20b. Using the same squaring method, the tool is locked in position on the pipe 330 for marking and/or cutting the pipe end so that it will match the end of pipe 328. With square ends of the pipes 328 and 330, an elongated elbow may be welded therebetween with no stress at the weld locations.

Figures 23, 24:
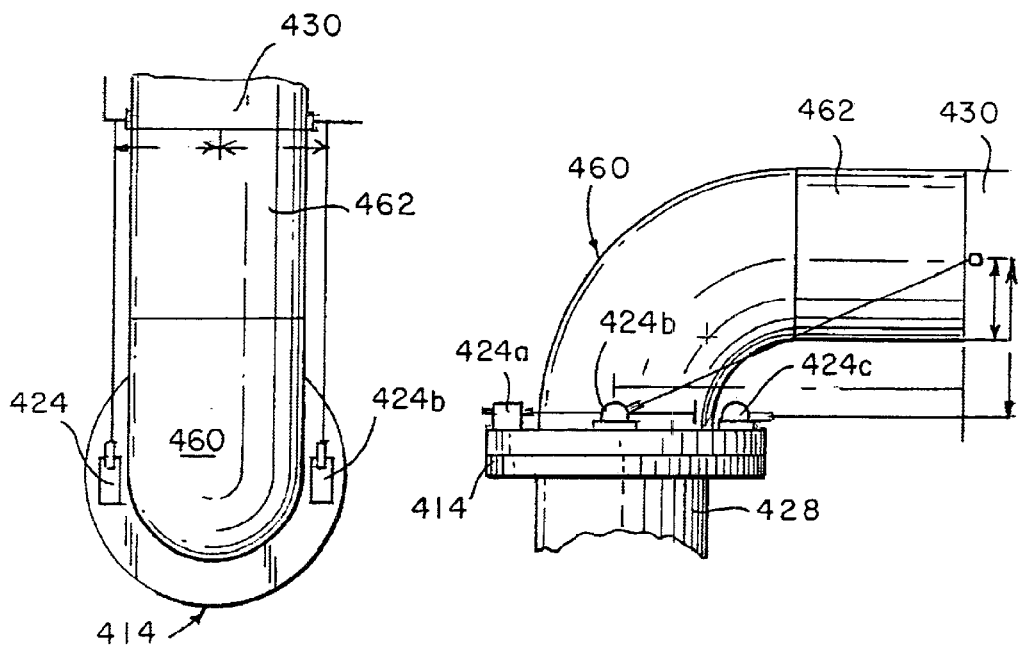
FIGS. 23 and 24 are top and side plan views showing the technique for replacing an elongated elbow section.

FIGS. 23 and 24 show the use of the alignment tool 414 for cutting a pipe 428 prior to an elbow 460 for removal of the elbow which may or may not include an elongated cylindrical portion 462. The tool includes lasers 424a, b, and c which are positioned as in the embodiments of FIGS. 20 and 22 to cut the pipe 428 so that its face will match that of a location on the pipe 430 at the far end of the elbow. In this manner, a damaged elbow section can be easily replaced without re-trimming or otherwise reconfiguring the pipe end faces after the damaged elbow section has been removed. This greatly reduces the time required for replacement of a damaged pipe section. Moreover, because of the squared ends, the replacement elbow can be installed without adding any stress to the piping system.

With the method and apparatus of the invention, the man hours required by a pipe fitter for repair and replacement of damaged pipes in an industrial plant are greatly reduced, thus resulting in substantial savings in maintaining and refurbishing a plant. The alignment and cutting tool is inexpensive and easy to use and requires little training of the pipe fitter.

While the preferred forms and embodiments of the invention have been illustrated and described, it will be apparent to those of ordinary skill in the art that various changes and modifications may be made without deviating from the inventive concepts set forth above.

What is claimed is:

1. Apparatus for aligning and cutting a cylindrical pipe having a longitudinal axis, comprising
    (a) a first frame adjustably mounted on the pipe;
    (b) laser means connected with said frame for generating a linear laser beam;
    (c) means for adjusting said frame on the pipe to direct said laser beam on a fixed remote target corresponding with the configuration of an end surface of a second pipe to be connected with the pipe; and
    (d) a cutting tool connected with said frame, said cutting tool being movable around the circumference of the pipe to cut the pipe in a configuration to mate with the end surface of the second pipe corresponding with the remote target.

2. Apparatus as defined in claim 1, wherein said laser means comprises a plurality of lasers spaced about said frame.

3. Apparatus as defined in claim 2, wherein said lasers are connected with said frame via adjustable mounting brackets, whereby laser beams from said lasers can be directed at selected angles relative to the longitudinal axis of the pipe.

4. Apparatus as defined in claim 1, wherein said frame comprises an inner ring mounted on said pipe and an outer track which rotates relative to said inner ring about the circumference of the pipe.

5. Apparatus as defined in claim 4, wherein said laser means are mounted on said track beyond the circumference of the pipe.

6. A method for defining a cutting line for the end face of a cylindrical pipe having a longitudinal axis, comprising the steps of
    (a) mounting a ring on the pipe about the circumference thereof
    (b) generating a linear laser beam from the ring; and
    (c) adjusting the ring to a fixed position relative to the pipe to direct the laser beam onto a first fixed remote target corresponding with the configuration of an end surface of a second pipe to be connected with the pipe, whereby when the ring is adjusted to the fixed position, the ring defines a cutting location so that after cutting, the cut end surface of the pipe will accurately mate with the end surface of the second pipe.

7. A method as defined in claim 6, wherein said adjusting step includes rotating the ring 90° about the pipe to direct the laser beam onto a second fixed remote target, whereby said ring is accurately positioned on the pipe relative to its longitudinal axis.

8. A method as defined in claim 6, and further comprising the steps of measuring a first distance from said laser to said first target, rotating the ring 90° about the pipe to direct the laser beam onto a second fixed remote target, and adjusting the ring to position the laser from said second target at a distance equal to said first distance.

9. A method as defined in claim 8, wherein said laser beam generating step comprises generating a plurality of laser beams from angularly spaced locations around the circumference of the pipe.

10. A method as defined in claim 9, and further comprising the step of adjusting the direction of at least one of said laser beams relative to the longitudinal axis of the pipe.

11. A method as defined in claim 10, and further comprising the step of
    (d) cutting the pipe with a cutting tool at the cutting location.

12. A method as defined in claim 8, and further comprising the step of
    (d) cutting the pipe with a cutting tool at the cutting location.

13. A method as defined in claim 12, and further comprising the steps of
    (e) mounting the ring at a second location on the pipe; and
    (f) repeating steps (b)–(d), whereby a portion of the pipe between an original cutting location and the second cutting location can be removed.

14. A method as defined in claim 13, and further comprising the steps of
    (g) repeating steps (a)–(d) on the ends of a replacement section of pipe;
    (h) inserting said replacement section of pipe in an area vacated by the removed portion of pipe; and
    (i) welding the replacement section of pipe to the original pipe.

15. A method as defined in claim 8, and further comprising the steps of
    (e) mounting a second ring on the pipe at a second location spaced from an original cutting location; and
    (f) repeating steps (b)–(d), whereby a portion of the pipe between the original cutting location and the second cutting location can be removed.

16. A method for defining a cutting line for the end face of a cylindrical first pipe adjacent to an elbow portion thereof, comprising the steps of
    (a) mounting a ring on the first pipe about the circumference thereof and before the elbow portion;
    (b) establishing a pair of first reference points spaced 90° relative to a longitudinal axis of a second pipe to a remote location beyond the elbow portion of the first pipe;
    (c) establishing a pair of second reference points on the ring and spaced 90° relative to a longitudinal axis of the first pipe; and
    (d) adjusting the ring to a fixed position so that the pair of second reference points are oriented in a configuration corresponding to the pair of first reference points to define a cutting location so that after cutting, the cut end surface of the first pipe will be in 90° alignment with the end surface of the second pipe.

17. A method as defined in claim 16, and further comprising the step of adjusting the ring via triangulation.

18. A method as defined in claim 17, wherein said second reference points comprise laser light sources mounted on the ring.

19. A method as defined in claim 18, wherein said first reference points are defined relative to the inner bend distance of the elbow portion.

20. A method as defined in claim 19, wherein said first reference points define target locations for beams from said laser light sources, respectively.

21. A method as defined in claim 20, and further comprising the step of cutting said first pipe at the cutting location.

22. A method for aligning and cutting a cylindrical pipe adjacent to an elbow portion thereof, comprising the steps of (a) mounting a frame on a first portion of the pipe about the circumference thereof (b) generating a first linear laser beam from the frame in a direction normal to a longitudinal axis of the first pipe at a location to be cut to a first point spaced from a second pipe by a distance corresponding to an inner bend of the elbow;

(c) measuring a second distance along said first beam from a center of said pipe first portion to said first point;

(d) measuring a third distance from said first point to a center of said second pipe;

(e) directing second and third laser beams from the frame at second and third points 90° offset from the first beam to corresponding second and third points on opposite sides of the second pipe;

(f) re-directing said first laser beam to strike a bottom portion of the second pipe;

(g) adjusting the frame so that the square of a fourth distance along said first beam between said second pipe and said frame is equal to the sum of the square of the second and third distances; and (h) cutting the pipe with a cutting tool mounted on the frame for rotation about the circumference of the pipe, whereby the end surface of the pipe first portion is cut to a configuration to match an end surface of the second pipe.

\* \* \* \* \*